United States Patent [19]

Norris et al.

[11] 4,385,377
[45] May 24, 1983

[54] PULSE POSITION TIME DIVISION SURFACE WAVE DEVICE TRANSMITTER

[75] Inventors: Jerry L. Norris, Dallas; Clinton S. Hartmann, Richardson, both of Tex.

[73] Assignee: Texas Instruments Incorporated, Dallas, Tex.

[21] Appl. No.: 869,410

[22] Filed: Jan. 16, 1978

[51] Int. Cl.³ .......................... H04J 6/00; H04J 13/00
[52] U.S. Cl. ........................................... 370/10; 370/9
[58] Field of Search .......... 179/15 A, 15 AW, 15 BC, 179/15 BA; 310/313; 333/72, 30 R; 364/821

[56] References Cited

U.S. PATENT DOCUMENTS

| 2,861,257 | 11/1958 | Weintraub | 179/15 AW |
| 3,239,761 | 3/1966 | Godde | 179/15 BA |
| 3,663,899 | 5/1972 | Dieulesaint | 310/313 |
| 3,803,395 | 4/1974 | Quate | 310/313 |
| 3,985,968 | 10/1976 | Stelzenmuller | 179/15 BC |
| 4,055,758 | 10/1977 | Stern | 364/821 |

OTHER PUBLICATIONS

Transmission Systems for Communications; Staff, Bell Telephone Laboratories; Copyright, 1970; pp. 116, 117.
Digital Communications, RCA Institutes, Copyright 1968; pp. 119-122 and 124-125.

Primary Examiner—David L. Stewart
Attorney, Agent, or Firm—William E. Hiller; Melvin Sharp; James T. Comfort

[57] ABSTRACT

A device for sample modulating electronic information signals, which includes a pulse position modulating circuit having a first input coupled to receive information signals, a second input coupled to simultaneously receive uniformly spaced sampling signals, and an output for generating thereon in response to each sampling signal an electronic output impulse at a time instant indicating the amplitude of the simultaneously received information signals. Also included is an acoustic surface wave device having an impulse response of predetermined shape and finite length. The surface wave device has an input coupled to receive the impulses from the pulse position modulating circuit for generating in response thereto output signals proportional to the convolution of the impulses with the impulse response. Accordingly, these output signals also are of predetermined shape and finite length, and thus have a highly controllable frequency spectrum.

11 Claims, 21 Drawing Figures

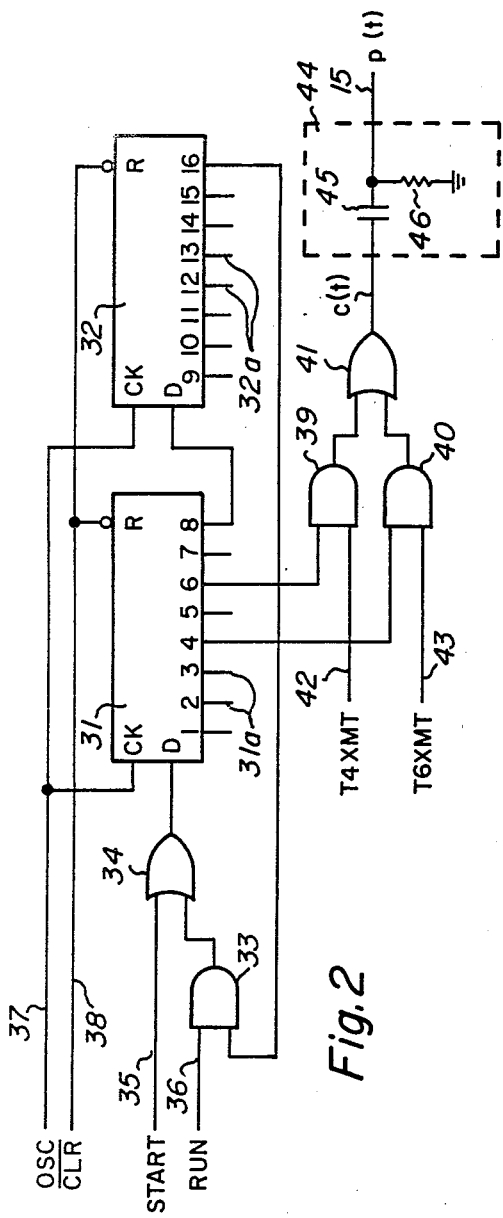
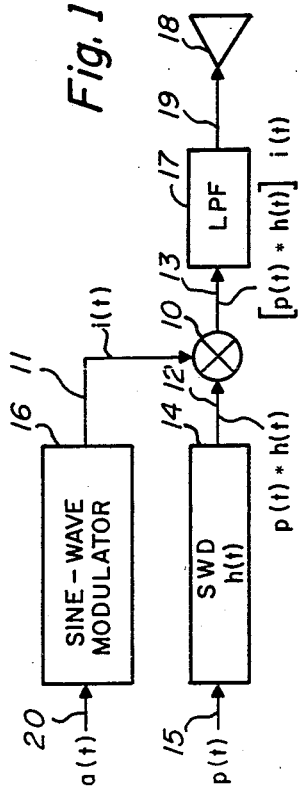
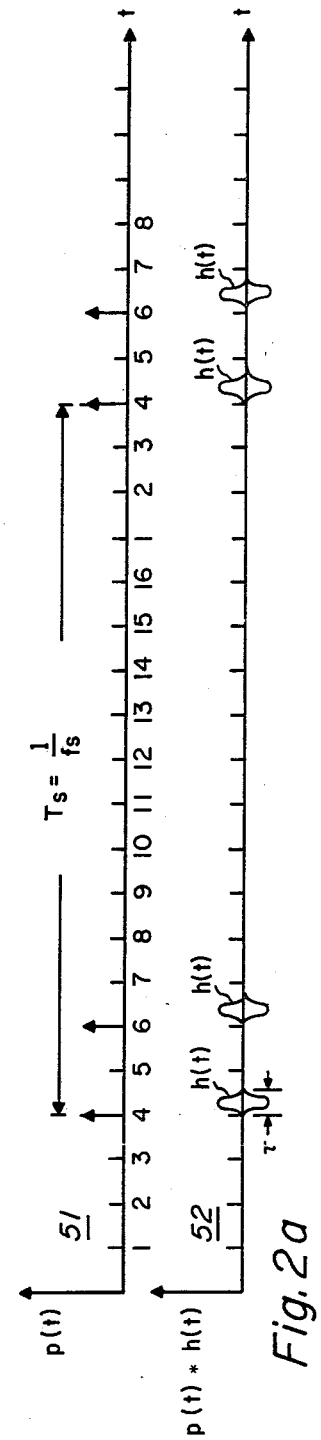
Fig. 2
Fig. 1
Fig. 2a

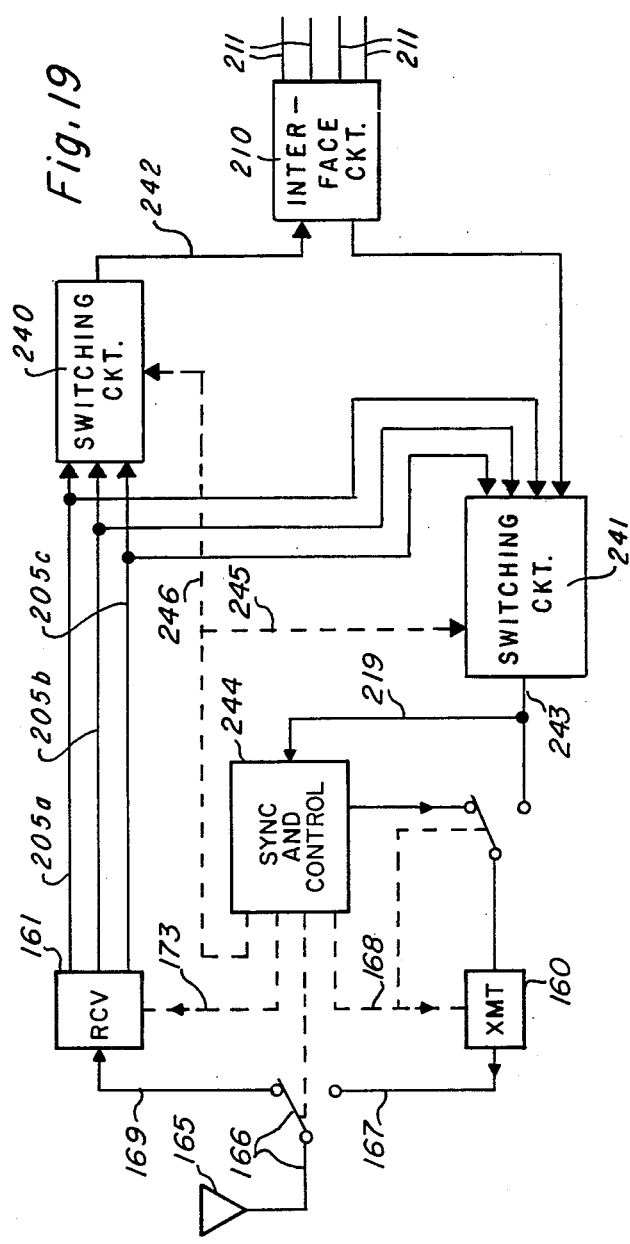

PULSE POSITION TIME DIVISION SURFACE WAVE DEVICE TRANSMITTER

BACKGROUND OF THE INVENTION

This invention relates to wireless electronic information transmitters, and more particularly to wireless transmitters which transmit information on a time division basis. Basically, a wireless transmitter transmits the information signals via electromagnetic radiation. These radiated signals may be amplitude modulated, frequency modulated, single-sideband modulated, or pulse position modulated as an example. A variety of circuits have been described in the prior art for performing this modulation. See for example, a book entitled, Information Transmission, Modulation, and Noise by Mischa Schwartz published by McGraw-Hill in 1959.

Since wireless transmitters use electromagnetic radiation to transmit their signals, the electromagnetic frequency spectrum must be divided up in a manner which enables multiple users to transmit simultaneously. Presently, one method of accomplishing this is to assign specific frequency bands to each of the multiple users. However, a problem with this method is that to allow more users to transmit requires that the width of the bands be reduced. As a result, the maximum frequency of the information signals which each user may transmit is also reduced. Further, as the number of frequency bands increase, the circuitry required to filter one band from the adjacent bands becomes more complex.

Another method for enabling multiple users to transmit simultaneously is to assign one frequency band to the multiple users and to time share its use. In this method, each user samples their information signals; and the samples of all the users are transmitted in an interleaved manner such that none of the samples overlap in time. A problem however, with the time division transmitters of the prior art is that the sampling signals themselves have an undesirably wide frequency spectrum. As a result, the width of the one time shared frequency band is also undesirably large. In some systems the ratio of number of users to frequency bandwidth for the time shared transmit method is less than the ratio of number of users to total bandwidth used by a channel assignment transmit method. See for example pages 160-163 of the above cited reference wherein the frequency spectrum of square wave sampled information signals is described. This spectrum equals the frequency spectrum of the unsampled information signals centered about multiples of the sampling frequency, with each multiple having a sine x/x weighting. Accordingly in that system, the frequency spectrum of the sampled signals extended out to the frequency at which the amplitude of the sine x/x function became sufficiently small itself becomes excessive.

Therefore, it is one object of the invention to provide an improved time division transmitter.

It is another object of the invention to provide a time division transmitter having sampling signals of a highly controllable bandwidth.

It is another object of the invention to provide a time division transmitter having specially shaped sampling signals which are physically realizable with a surface wave device.

Still another object of the invention is to provide a wireless time division portable telephone which is suitable for coupling to a telephone system.

SUMMARY OF THE INVENTION

These and other objectives are accomplished in accordance with the invention by an electronic device for sample modulating which includes a pulse position modulating circuit and an acoustic surface wave device. The pulse position modulating circuit has a first input coupled to receive information signals for transmission, a second input coupled to simultaneously receive uniformly spaced sampling signals, and an output for generating thereon in response to each sampling signal an electric output impulse at a time instant indicating the amplitude of the simultaneously received information signal. The acoustic wave device has an input coupled to receive the impulses from the pulse position modulating circuit. The acoustic surface wave device also has an impulse response of predetermined shape and finite length both of which are highly controllable. In particular embodiments, this predetermined shape has an envelope which is either Gaussian shaped, Dolph-Chebyshev shaped, or a Taylor approximation to a Dolph-Chebyshev shape. The surface wave device generates sampling signals at its output proportional to its impulse response; and accordingly, these signals have a highly controllable frequency spectrum. The predetermined shape of the impulse response is physically implemented in the surface wave device by transducers of various forms. Preferably, these transducers include a plurality of interdigited metal fingers which alternatively are arranged with either uniform spacing and non-uniform overlap, or non-uniform spacing and uniform overlap, or uniform spacing and uniform overlap but with selected fingers removed.

BRIEF DESCRIPTION OF THE DRAWINGS

The invention, as well as the features and advantages thereof, will best be understood by reference to the following detailed description of particular embodiments when read in conjunction with the accompanying drawings, wherein:

FIG. 1 is a block diagram of a first embodiment of a time division sample modulator constructed according to the invention;

FIG. 2 is a logic diagram of a clocking circuit suitable for generating impulses for use within the sample modulator device of FIG. 1;

FIG. 2a shows timing diagrams illustrating when the time division sample modulator of FIG. 1 is transmitting;

FIG. 19 is a block diagram of a base unit for implementing the transmit sequence of FIG. 18; and FIG. 20 is a timing diagram of predetermined sets of time intervals defining a third time division transmit sequence for the system of FIG. 13.

DETAILED DESCRIPTION

Figure 3:
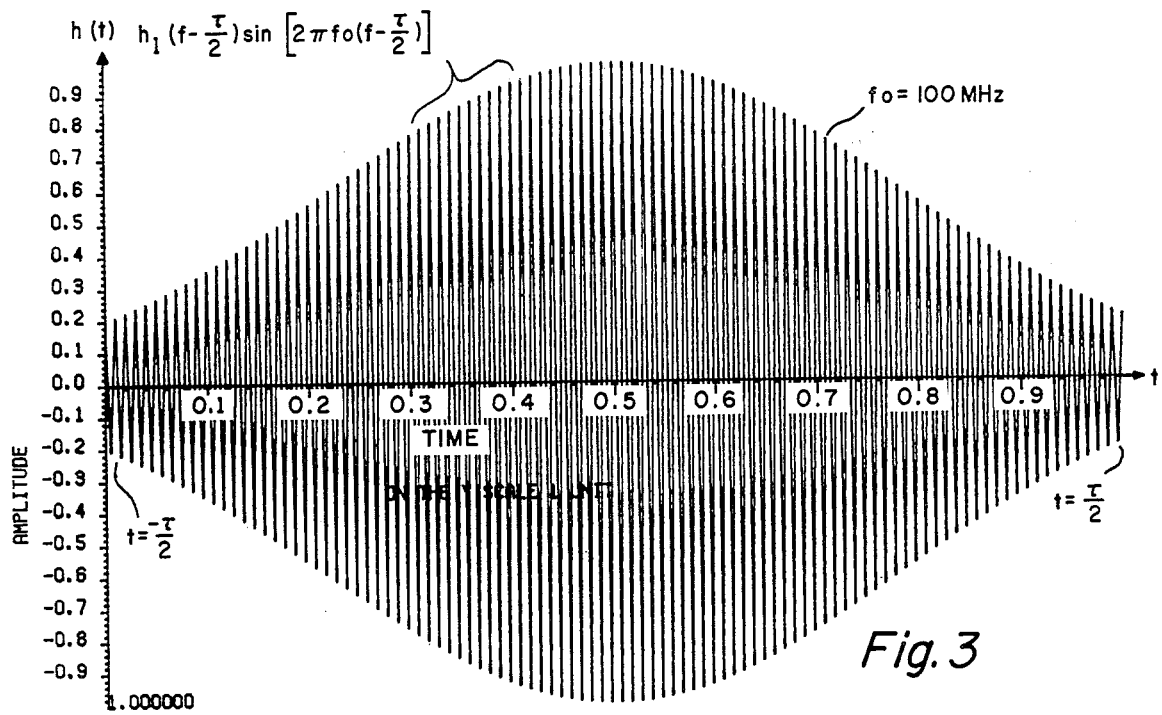
FIG. 3 is a diagram of one preferred time domain impulse response for the surface wave device incorporated within the time division sample modulator of FIG. 1.

A block diagram of a first embodiment of a time division sample modulating device constructed according to the invention is illustrated in FIG. 1. The first embodiment includes mixing means 10 having a first input lead 11 coupled to receive information signals i(t) and having a second input lead 12 for receiving electrical sampling signals p(t)*h(t). Mixer 10 also has an output lead 13 and generates thereon electrical signals proportional to the product of information signals i(t) and sampling signals p(t)*h(t). Also included in the first embodiment is an acoustic surface wave device 14 having an impulse response h(t) which is of predetermined shape and of a finite length. Acoustic surface wave device 14 has an input lead 15 for receiving impulse signals p(t) thereon, and has an output coupled to lead 12 of mixer 10 for generating thereon the sampling signals p(t)*h(t) as the convolution of the impulses p(t) with the impulse response h(t).

Of particular importance to the first embodiment is the exact shape of impulse response h(t) and the sequence in which impulse signals p(t) are generated. In general the shape of impulse h(t) determines the bandwidth occupied by the signals which the first embodiment transmits; while the sequence of impulse signals p(t) determines the bandwidth which information signals i(t) can have and also determines the manner in which multiple ones of the first embodiment can be combined in a system. A detailed analysis of these aspects of the invention follows shortly.

The first embodiment also includes a sine wave modulator 16 having an input lead for receiving signals a(t) in the audio range and having an output coupled to lead 11 for generating signals i(t) thereon. Modulator 16 may be of various types-such as a frequency modulator, a phase modulator, an amplitude modulator, or a single sideband modulator. Preferably, modulator 16 is a wide band frequency modulator having a modulation index in the range of 5-40. Wide band frequency modulation is preferred because the modulated signals exhibit a "capture effect". That is, when two or more transmitters transmit simultaneously in the same frequency band, a receiver is able to discriminate the stronger signals from the weaker signals. This property is useful when transmitters of the first embodiment are combined in a system. Using wideband modulation causes the bandwidth of the information signals i(t) to be several times larger than the bandwidth of the audio range signals a(t); however it still is many times smaller than the bandwidth of the sampling signals p(t)*h(t) on lead 12. Thus the bandwidth of signals i(t) generally is not a limiting factor.

The center of the signals generated on leads 11 and 12 are generated such that either their sum or difference lies in the center of a frequency band in which transmission is to occur. For example, signals on lead 11 may have a center frequency of 800 MHz; while signals on lead 12 may have a center frequency of 100 MHz. Accordingly, the output signals of mixer 10 have a frequency spectrum centered at 700 MHz and 900 MHz. A low pass filter having an input coupled to output lead 13 operates to pass only the frequency spectrum at 700 MHz. An antenna 18 couples to the output of filter 17 via a lead 19; and signals generated thereon are transmitted via electromagnetic radiation in one finite frequency band.

Clocking means suitable for generating impulses p(t) on lead 15 to activate impulse response h(t) are illustrated in FIG. 2 as an example. Included therein are 8 bit digital shift registers 31 and 32. Registers 31 and 32 have output leads 31a and 32a respectively. The last output of register 31 couples to an input D of register 32; and the last output of register 32 couples to an input D of register 31 through logic gates 33 and 34 to thereby form a ring counter. Logical control input leads 35 and 36 are provided as a means for initiating the first stage within shaft register 31 and a means for continually cycling the output from the last stage of register 32 to the input of the first stage of register 31. Leads 37 and 38 are also provided to receive clocking signal OSC from an oscillator and clear signals $\overline{CLR}$ respectively.

Registers 31 and 32 shift data from one stage to another for each cycle of the OSC signal. In a system comprised of a plurality of the FIG. 1 embodiments, the OSC signal preferably is generated from a phase locked oscillator, with the oscillator in each transmitter being locked in phase to the others. Any one of a variety of conventional phase locked oscillators are suitable for this purpose. The clocking means of FIG. 2 also includes logic gates 39, 40 and 41 which select predetermined outputs of registers 31 and 32. Outputs 4 and 6 are selected in the illustrated example. Control leads 42 and 43 provide a means for logically selecting one or both of the outputs via logic signals T4XMT and T6XMT. The source of these logic signals as well as the other logic signals of FIG. 2 may be generated by a variety of sources-such as keyboard control switches or microprocessor controls.

Logic gate 41 has an output coupled to an impulse generating circuit 44. In the illustrated example, circuit 44 includes a capacitor 45 connected to a resistor 46 to form a differentiating circuit. Lead 15 couples to the output of impulse generating circuit 44.

Timing diagrams illustrating the periods during which first embodiment transmits are illustrated in FIG. 2a. In particular, a diagram 51 illustrates the impulses p(t) being generated as a function of time under the condition where the logic signals on leads 42 and 43 enable impulses to be generated during time intervals T4 and T6. These impulses activate surface wave device 14 so as to cause sampling signals on lead 12 as indicated in diagram 52. Each of the sampling signals is proportional to the predetermined shape of the impulse response h(t) which lasts for finite length $\tau$. Time interval $\tau$ must be less than the period of the OSC signals on lead 37 so that each impulse response ends before another one begins. On the other hand, the frequency of signals OSC divided by the number of stages in the FIG. 2 ring counter determine the rate at which signals on lead 11 are sampled; and this sampling rate must be greater than twice the bandwidth of the signals on lead 11.

Referring now to FIG. 3, a detailed diagram of one preferred time domain impulse response h(t) of surface wave device 14 is illustrated. This particular impulse response has a predetermined shape of the form $h_1(t-\tau/2)$ sine $(2\pi f_0 t - \tau/2)$ during the time interval $-\tau/2$ to $+\tau/2$. Function $h_1(t-\tau/2)$ is a Gaussian function of the form of EXP $[-\pi(t-\tau/2\Delta t)^2]$. Thus, this particular impulse response varies in a sinusoidal fashion at a frequency $f_0$ within an envelope having a Gaussian shape. Such an impulse response may be physically achieved by surface wave devices described later herein in conjunction with FIGS. 6 and 7.

Figure 4:
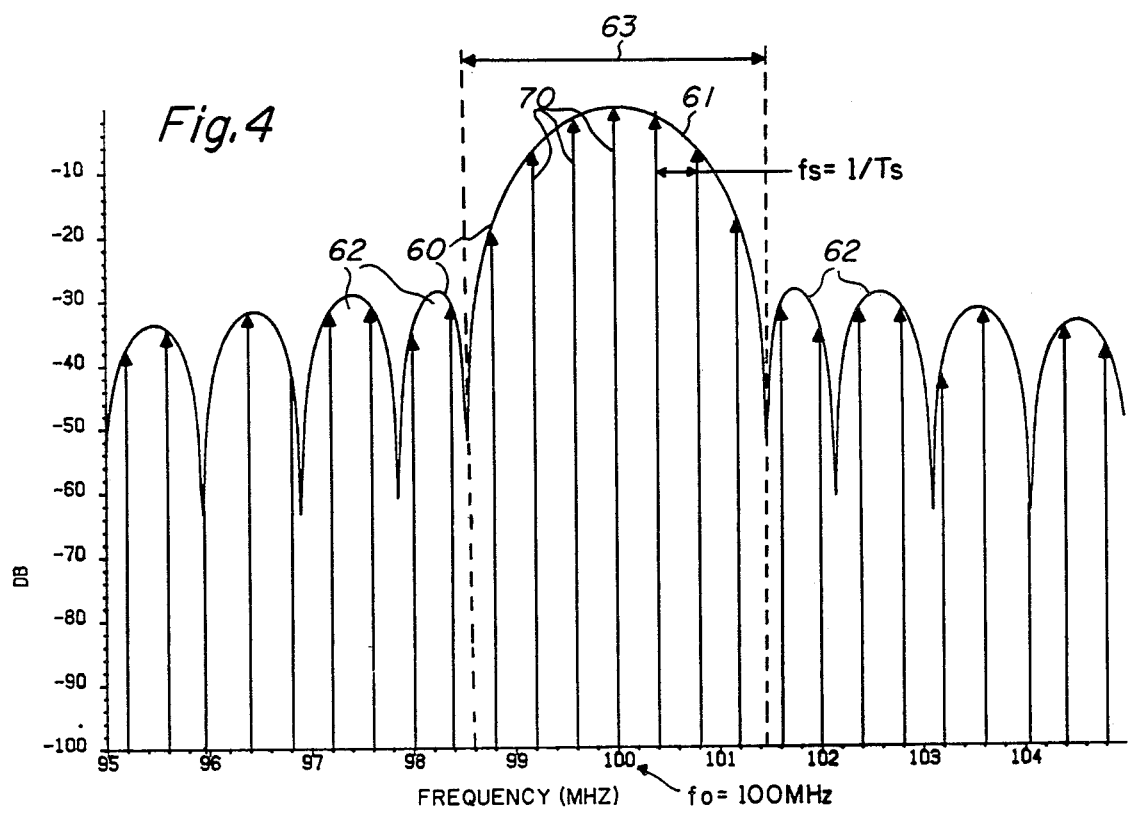
FIG. 4 is a frequency diagram of the impulse response of FIG. 3.

The relationship between the shape of impulse response h(t) and the frequency bandwidth occupied by signals transmitted via antenna 18 will now be described with reference to FIGS. 4 and 5. FIG. 4 includes a curve 60 which is the Fourier transform of the impulse response of FIG. 3. Accordingly, curve 60 is of the form:

$$\text{EXP}\{-\pi[\Delta t(f-f_0)]^2\} * \frac{\sin[\pi\tau(f-f_0)]}{\pi\tau(f-f_0)} \text{ times EXP}(j2\pi f\tau/2)$$

where * denotes convolution. Basically, as illustrated in FIG. 4 the most significant frequency components of the impulse response are contained in one main lobe 61; while a number of much less significant components are contained in a plurality of side lobes 62. By utilizing the Gaussian shaped impulse response, the largest amplitude within the side lobe frequencies is made substantially less than the largest amplitude within the main lobe frequencies. In particular, the largest amplitude of the side lobe frequencies illustrated in FIG. 4 is almost 30 dB less than the largest amplitude of the frequencies within the main lobe. By comparison, the largest amplitude of side lobe frequencies within the frequency spectrum corresponding to a rectangular shaped sample of the finite length $\tau$ are only approximately 13 dB less than the amplitude of frequencies within the main lobe.

Also illustrated in FIG. 4 is a set of discrete frequencies 70. These discrete frequency components are the frequency spectrum of a plurality of impulses each of which has the shape as illustrated in FIG. 3 and which are spaced apart by a uniform time interval $T_s$ as was illustrated in FIG. 2a. The frequency component having the largest magnitude is frequency $f_0$—which is the frequency of the sinusoidally varying signal within impulse rewponse h(t). Each of the remaining discrete frequencies 70 is spaced apart from frequency $f_0$ by integer multiples of a frequency $f_s$. Frequency $f_s$ is the reciprocal of the time interval $T_s$. Thus, for example, discrete frequency components 70 are separated by 100 KHz when the total recycle time of the FIG. 2 ring counter is ten microseconds.

Main lobe 61 has a bandwidth 63 that is inversely proportional to the length of impulse response h(t). For a Gaussian shaped impulse response, the proportionality factor is approximately equal to 3. This is exemplified by FIGS. 3 and 4 wherein the bandwidth of the main lobe 61 is approximately 2 MHz while the finite length of impulse response h(t) is approximately 1 us.

Length $\tau$ of h(t) is also interrelated to the sampling period $T_s$ in a manner which determines the number of transmitters that may be combined to form a time division transmitting system. In particular, as $\tau$ decreases, an increased number of units may be combined to form a system. On the other hand, the width of main lobe 61 and the corresponding bandwidth will proportionately increase. The number of units which may be combined in a time division system may also be increased by increasing $T_s$, but then the spacing between discrete frequency components 70 is proportionately decreased, which limits the maximum bandwidth of the information signals i(t).

Figure 5:
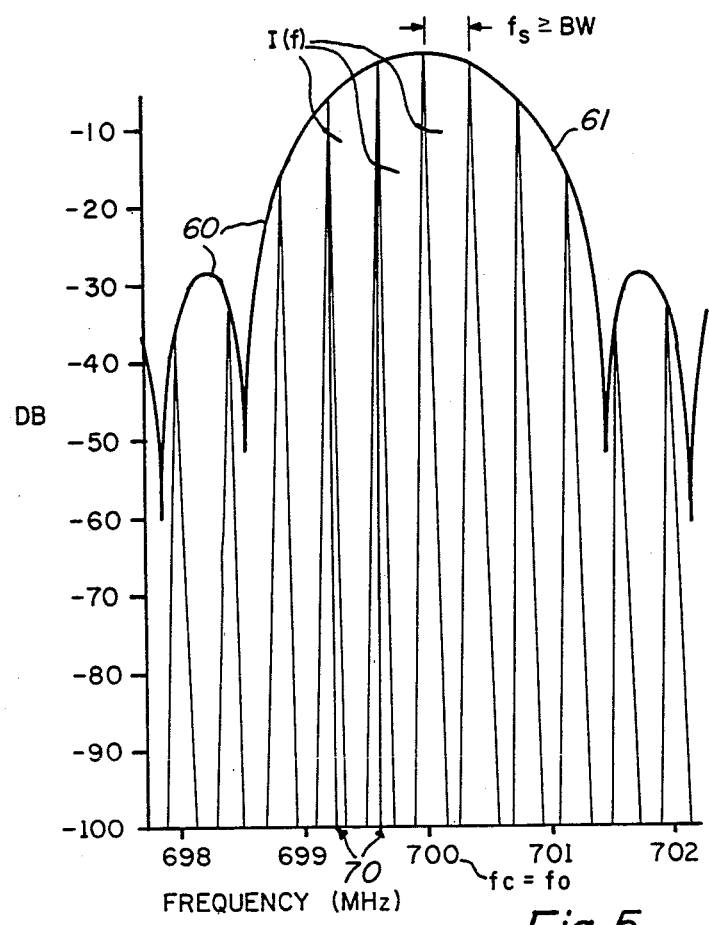
FIG. 5 is an enlarged view of one portion of the frequency diagram of FIG. 4.

The above interrelationships are illustrated in FIG. 5 which is a frequency diagram of the signals that are transmitted via antenna 18. FIG. 5 is similar in shape to the frequency diagram of FIG. 4; and corresponding portions have like reference numerals. One difference between the two frequency diagrams is that in FIG. 5, the center frequency of main lobe 61 and all other discrete frequency components 70 are frequency shifted by 600 MHz. This frequency shift is due to the multiplication function performed by mixer 10 and the filtering performed by filter 7. Also in FIG. 5, frequency spectrums I(f) of the information signals on lead 11 are centered about each of the discrete frequency components 70. Thus, as pointed out above, sampling rate $f_s$ must be greater than the bandwidth of information signals i(t). If signals i(t) are wide band frequency modulated signals, they may typically be 50 KHz wide, and thus a sampling rate of 100 KHz as previously described would be suitable.

Figure 6:
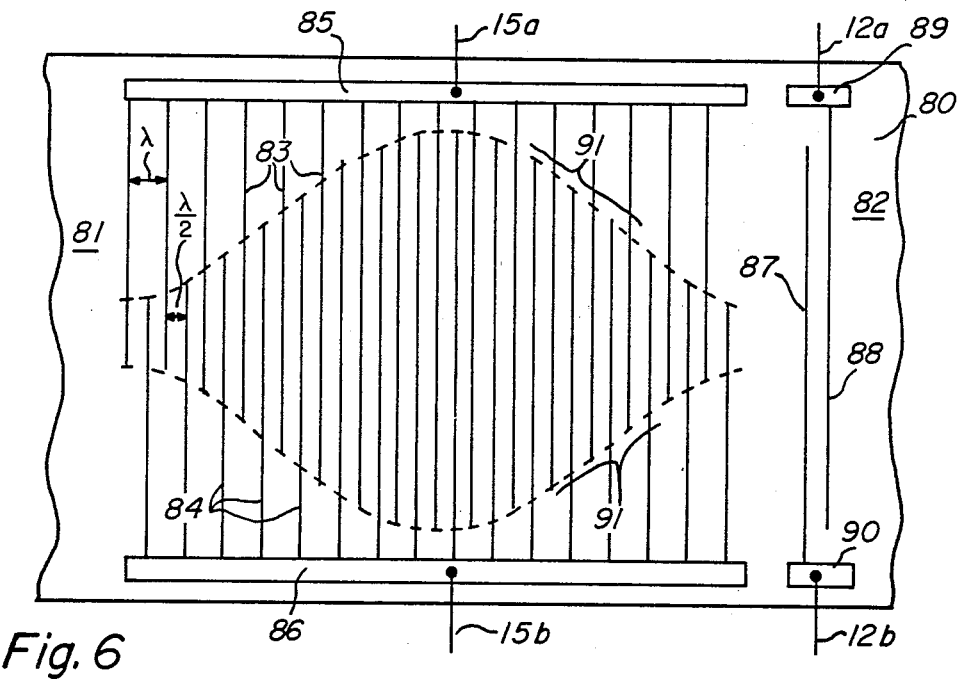
FIG. 6 is a schematic diagram illustrating a structure of a surface wave device which implements the impulse response of FIG. 3.

A schematic diagram illustrating one structure for surface wave device 14 which is suitable for implementation of the above described impulse response is illustrated in FIG. 6. This surface wave device is comprised of a piezoelectric substrate 80 having a surface with an input transducer 81 and an output transducer 82 lying thereon. Transducer 81 is comprised of a first set of spaced apart metal electrodes 83 and a second set of spaced metal electrodes 84 which are interleaved between electrodes 83. Bonding pads 85 and 86 interconnect electrodes 83 and 84 respectively. Leads 15a and 15b respectively connect to bonding pads 85 and 86 to provide a means for applying impulse signals p(t) to the surface wave device. Similarly, output transducer 82 is comprised of electrodes 87 and 88 which are interleaved and are respectively corrected to bonding pads 90 and 89. Leads 12a and 12b connect to bonding pads 89 and 90 respectively and sampling signals p(t)*h(t) are generated thereon.

The impulse response of the surface wave device of FIG. 6 is completely determined by the spacings, the overlap, and the number of electrodes 83 and 84. In particular, electrodes 83 and 84 are uniformly spaced by a distance equal to half of the wave length λ of the acoustic waves that form the impulse response. That is, the uniform spacing λ equals $v_0$ divided by $f_0$ where $v_0$ is the velocity at which acoustic waves travel in substrate 80 and $f_0$ is the frequency of the sinusoidally varying component of the impulse response h(t). As an example, using a ST cut quartz substrate and $f_0$ equal to 100 MHz yields $V_0$ equal to $3.149 \times 10^5$ cm/sec. and a spacing between electrodes 83 and 84 of $1.575 \times 10^{-3}$ cm.

Also, the amplitude of the impulse response h(t) is directly proportional to the amount of overlap between electrodes 83 and 84. Therefore, electrodes 83 and 84 are arranged such that the profile of their overlap 91 is proportional to the envelope $h_1(t)$ of impulse response h(t). Compare for example FIG. 6 with FIG. 3. Additional details on the uniform spaced non-uniform overlap technique for constructing a particular impulse response have been previously described in a paper entitled "Impulse Model Design of Acoustic Surface-Wave Filters" Hartman et al, published in the *IEEE Transactions on Microwave Theory and Techniques,* Vol. MTT-21, No. 4, April 1973, pages 162-175.

Figure 7:
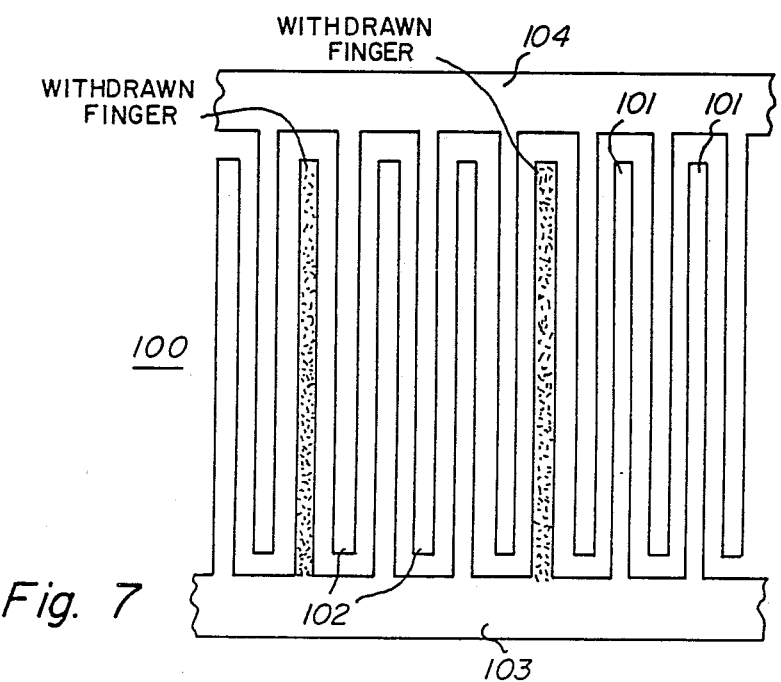
FIG. 7 is a schematic diagram illustrating another structure of a surface wave device which also implements the impulse response of FIG. 3.

Referring now to FIG. 7, a portion of an input transducer having a structure different than that of transducer 81 but having approximately the same impulse response is illustrated. Transducer 100 is comprised of a first set of electrodes 101 which are uniformly spaced and of equal length, and a second set of electrodes 102 which are interleaved between electrodes 101 and are also of the same uniform length. Conductive bonding pads 103 and 104 interconnect electrodes 101 and 102, respectively.

The frequency $f_0$ of transducer 100 is determined by the spacing between electrodes 101 and 102 as was previously described in conjunction with FIG. 6. However, the amplitude of the impulse response of transducer 100 is shaped by selectively withdrawing various ones of the electrodes 101 and 102. More specifically, the amplitude of each half cycle of sine wave of frequency $f_0$ in transducer 100 is proportional to ($\frac{1}{2}$L) EXP 3/2 where L is the distance between consecutive electrodes. Thus, the amplitude of the impulse response of transducer 100 is made relatively large by withdrawing no fingers and is made relatively small by withdrawing fingers. To implement the impulse response of FIG. 3, fingers are withdrawn at various points along the transducer in inverse proportion to the impulse response to be formed by that portion of the transducer. Additional details covering this method for shaping the impulse response of a surface wave transducer are described in U.S. Pat. No. 3,946,342, issued Mar. 23, 1976, to Hartmann.

Figure 8:
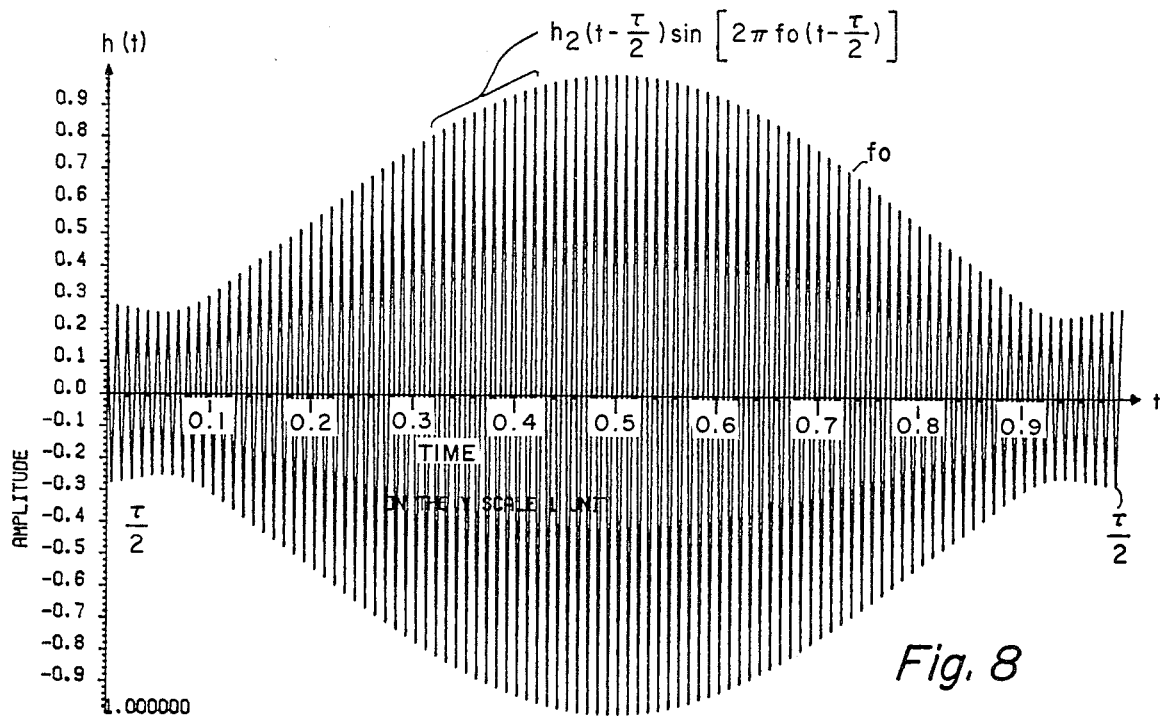
FIG. 8 is a diagram illustrating a second preferred time domain impulse response for the surface wave device incorporated within the time division sample modulator of FIG. 1.

A second preferred shape for impulse response h(t) of the surface wave device 14 is illustrated in FIG. 8. The second shape consists of a sinusoidal signal of frequency $f_0$ having an envelope $h_2(t-\tau/2)$. Envelope $h_2(t-\tau/2)$ is a Taylor approximation of a Dolph-Chebyshev curve; and mathematically, it is expressed as described on pages 180-182 of the book Radar Signals by Charles Cook and Marvin Bernfeld published by Academic Press in 1967. This impulse response may be implemented with a surface wave device of the forms previously described in conjunction with FIGS. 6 and 7.

Figure 9:
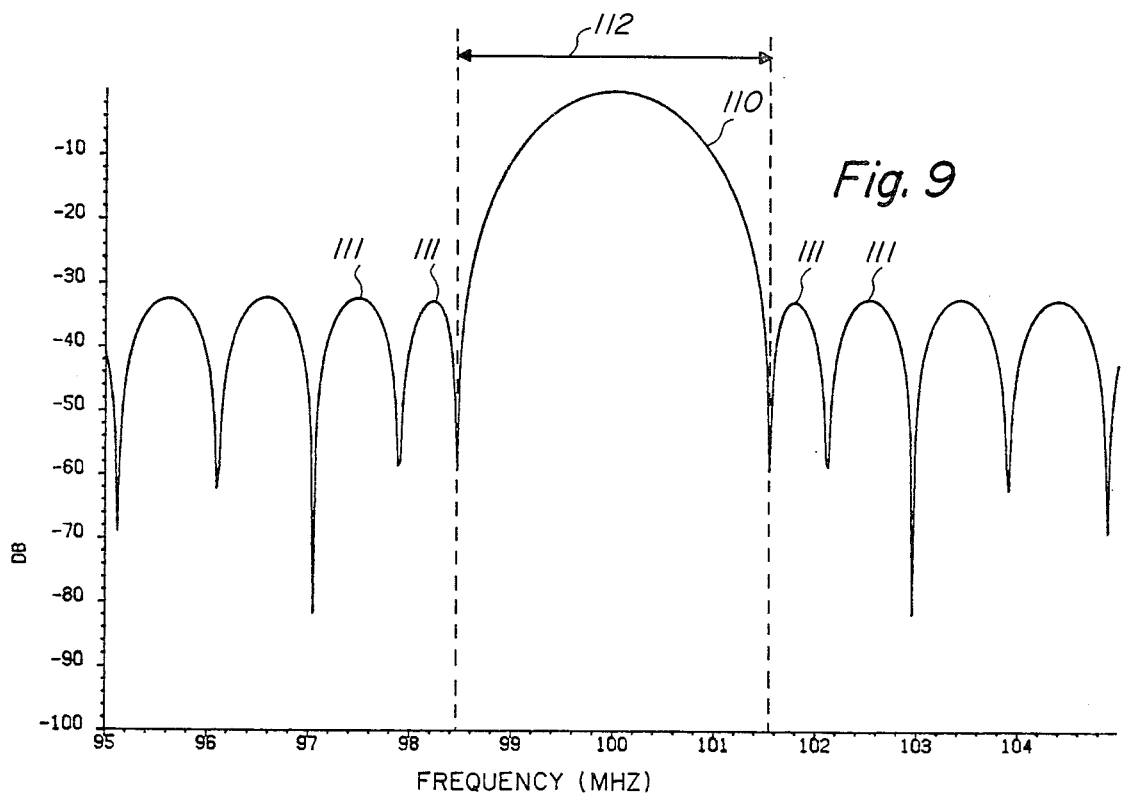
FIG. 9 is a diagram of the frequency domain impulse response corresponding to the time domain impulse response of FIG. 8.

Basically, this second impulse response is preferred because the corresponding frequency spectrum has smaller side lobes and a relatively steep transition from the main lobe to the side lobes. This is illustrated in FIG. 9, which is the frequency spectrum of the impulse of FIG. 8. The FIG. 9 spectrum includes one main lobe 110 and a plurality of side lobes 111. Signals within main lobe 110 are more than 30 db greater than the maximum amplitude of signals within the side lobes 111. This compares favorably with the relative amplitudes of the frequencies described in conjunction with FIG. 4. Also, main lobe 110 of FIG. 9 has a bandwidth 112 which is approximately the same as the bandwidth of the main lobe 61 of FIG. 4. That is, bandwidth 112 is inversely proportional to length τ, and the proportionality factor is approximately 3.

Figure 10:
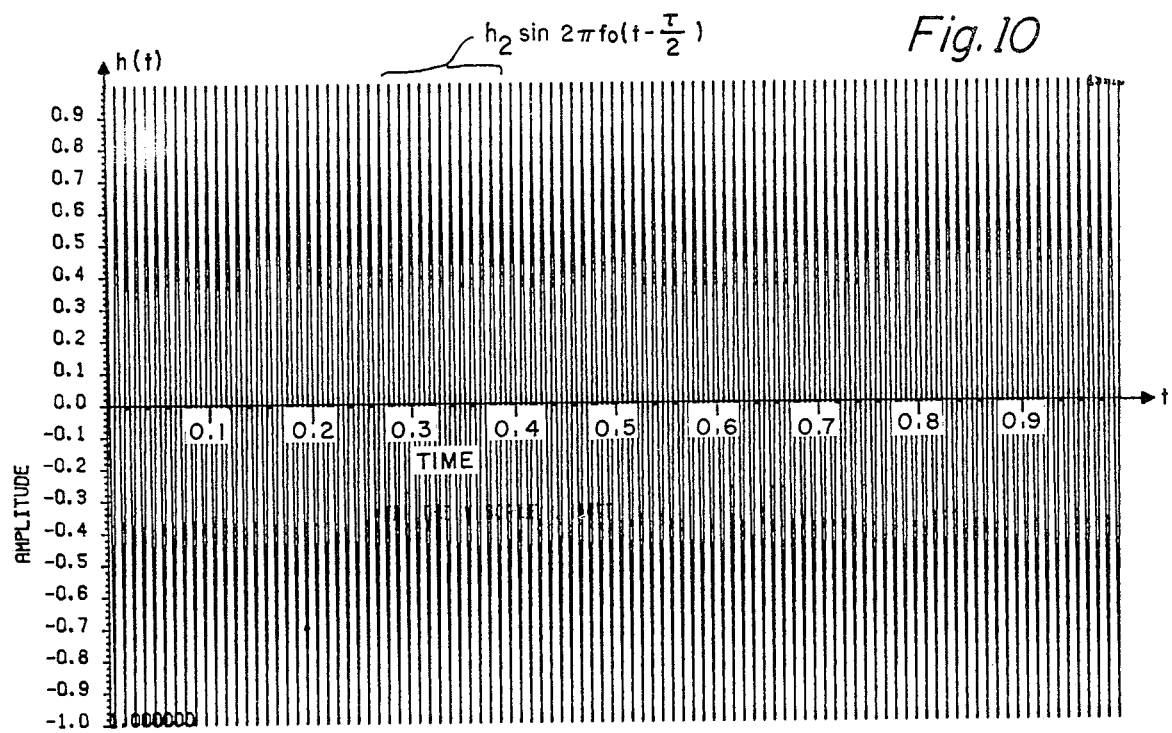
FIG. 10 is a diagram of a third preferred time domain impulse response for the surface wave device incorporated within the sample modulator of FIG. 1.
Figure 11:
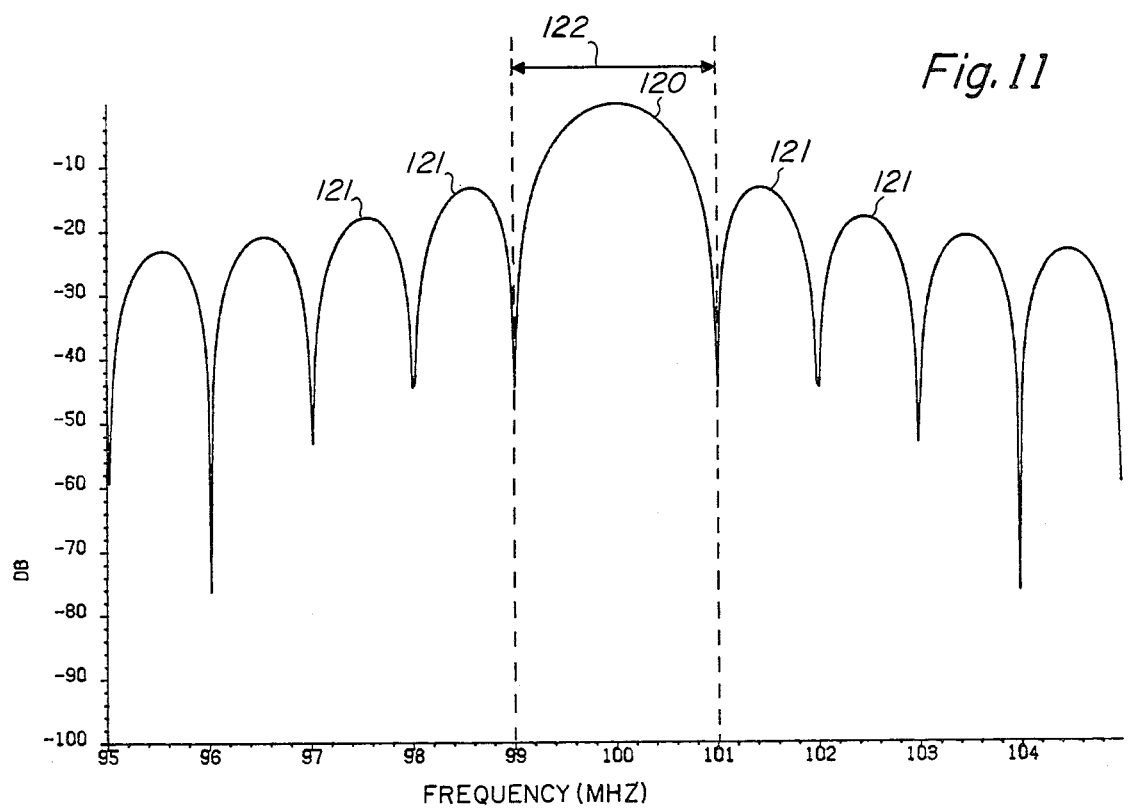
FIG. 11 is a diagram of the frequency domain impulse response corresponding to the time domain impulse response of FIG. 10.

As a third alternative, impulse response h(t) may be chosen to simply be a sinusoidally varying signal of constant amplitude $h_3$ which lasts for a time interval τ. Such an impulse response is illustrated in FIG. 10; and the corresponding frequency spectrum is illustrated in FIG. 11. The frequency spectrum of FIG. 11 includes a main lobe 120 and side lobes 121. Signals in the side lobes have amplitudes that are only approximately 13 db less than the maximum amplitude of signals in the main lobe 120. However, main lobe 120 has a bandwidth 122 which is less than the bandwidths 63 and 112 previously described. In other words, bandwidth 122 is inversely proportional to time interval τ, but the constant of proportionality is less than those previously described. Thus if the signals to be transmitted via electromagnetic radiation by antenna 18 is required to occupy a band of frequencies that are too narrow to achieve by a Gaussian shaped or Dolph-Chebyshev shaped surface wave device of practical lengths, then a surface wave device having the impulse response of FIG. 10 may be preferred. Alternatively, a serial combination of two or more surface wave devices may be used to effectively increase the parameter τ and thus decrease bandwidth. Preferably, the impulse response of this serial combination is of the form of FIG. 3, FIG. 8, or FIG. 10.

A second embodiment of a device for sampling modulating electronic information signals constructed according to the invention will now be described in conjunction with FIG. 12. The second embodiment includes pulse position modulating means 130 having an input lead 131 coupled to receive signals a(t) for transmission, and having another input lead 132 coupled to simultaneously receive uniformly spaced sampling signals. Signals a(t) on lead 131 are suitably in the audio frequency range; while clocking signals on leads 132 are suitably impulses p(t) or c(t) of the form previously illustrated in FIG. 2a as an example. Pulse position modulator 130 further includes an output lead 133 for generating thereon, in response to each sampling signal, an electrical impulse p(t−β a(t)) having a position in time indicating the amplitude of signals a(t) simultaneously received on lead 131. Lead 133 couples to the input of a surface wave device 134; and the surface wave device 134 has an output which couples to an antenna 135 via a lead 136.

Signals radiated by antenna 135 have a frequency spectrum that is very similar to the frequency spectrum of the signals radiated by the first embodiment. This can be shown by first considering the frequency spectrum of signals p(t−β a(t)) on lead 133. To do this, it is helpful to first express the signals on lead 133 in open form as $\delta(t-\beta \ a(0)) + \delta(t-T_s-\beta \ a(T_s)) + \delta(t-2T_s-\beta \ a(2T_s)) + \ldots$. In this form, the terms δ( ) represent an impulse that occurs when the quantity within the parentheses goes to zero. Now if the sampling rate of $1/T_s$ is substantially greater than the maximum frequency component of a(t), then $a(0) \simeq a(T_s) \simeq a(2T_s)$. Accordingly, the above expression is quasi periodic and thus its frequency components are approximately given by the expression:

$$C_n = \int_{-T_s/2}^{+T_s/2} \delta(t - \beta\, a(0))\text{EXP}(-j\, w_n t)\, dt.$$

Evaluating this integral yields $\text{EXP}(-j\, w_n \beta\, a(0))$. This term has a magnitude of one and a phase angle $w_n \beta\, a(0)$. Therefore, the signal on lead 133 is approximately comprised of a set of discrete frequencies having an amplitude of 1 which are spaced apart by the sampling frequency $f_s$ and which has a varying phase angle.

Multiplication of this frequency spectrum with the frequency spectrum of the impulse response h(t) of surface wave device 134 yields the frequency spectrum of the signals radiated by antenna 135. This is because signals on antenna 135 are the convolution of signals on lead 133 with impulse response h(t); and convolution in the time domain is the same as multiplication in the frequency domain. Thus, as an example, if the impulse response of surface wave device 134 is Gaussian shaped as illustrated in FIG. 3, signals radiated by antenna 135 have a frequency spectrum as illustrated in FIG. 4. Alternatively, if the impulse response of surface wave device 134 has a Dolph-Chebyshev shape of FIG. 8, then the frequency spectrum of signals radiated by antenna 135 consists of discrete frequency components spaced apart by the sampling frequency of $f_s$ with the amplitude profile of FIG. 9. Thus in the second embodiment, impulse response h(t) of surface wave device 134 may be shaped to achieve a desired bandwidth for the main lobe and a desired difference in amplitude between the main lobe and side lobes, as was previously described in conjunction with the first embodiment.

Figure 12:
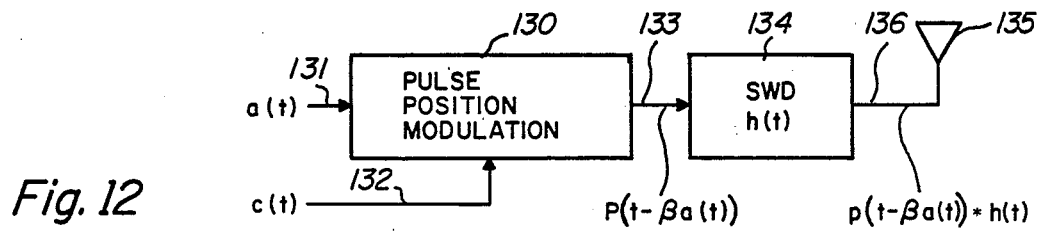
FIG. 12 is a block diagram of a second embodiment of a time division sample modulator constructed according to the invention.
Figure 13:
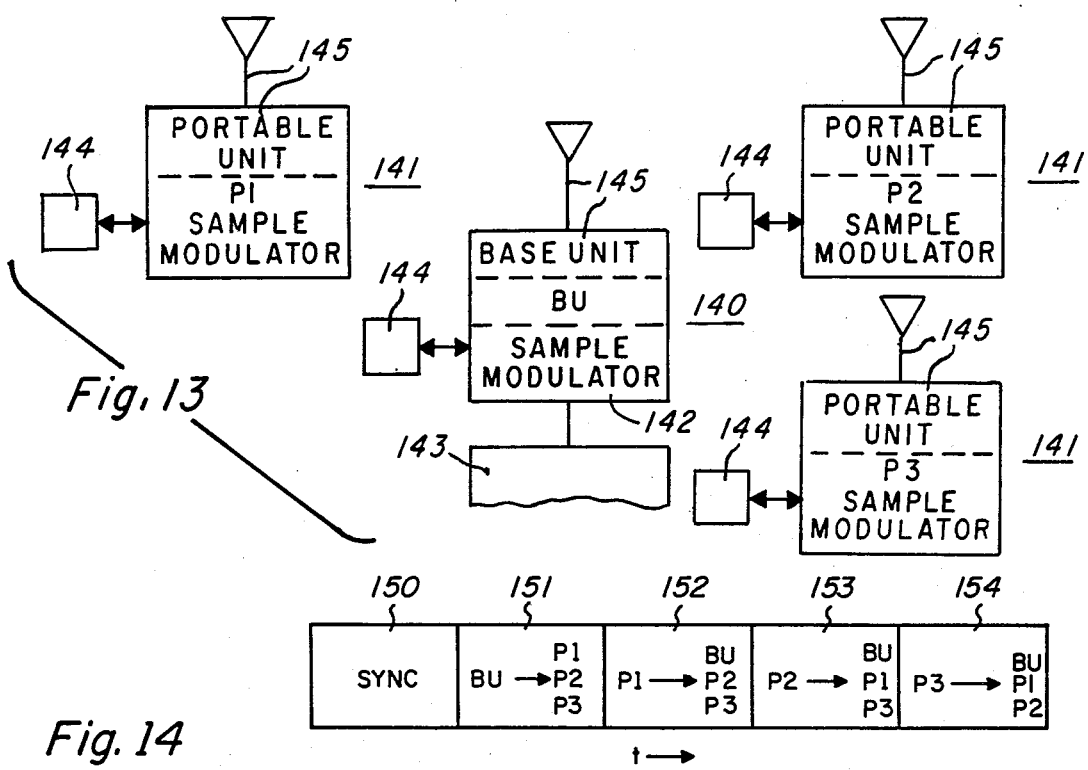
FIG. 13 is a block diagram of a cordless communication system which incorporates either the time division sample modulator of FIGS. 1 or 12.

FIG. 13 is a block diagram of a cordless telephone system incorporating the time division sample modulating devices of FIG. 1 or alternatively of FIG. 12. The cordless telephone system includes a base unit 140 and a number of portable units 141. Three portable units P1, P2, P3 are illustrated in FIG. 13 as an example of one cordless telephone system. In general, however, the number of portables may vary from one to N.

Base unit 140 includes circuit means 142 for transmitting electrical signals to and receiving electrical signals from a standardized telephone interface 143. In addition, base unit 140 and each portable unit 141 include input/output transducers 144 such as a keyboard, a microphone, and a speaker for inputting and receiving signals a(t) to/from the respective unit. Units 140 and 141 further include time division transmitter means 145 of the type previously described in conjunction with FIGS. 1 and 12 for transmitting information signals between the units via electro-magnetic radiation in one finite frequency band during predetermined sets of time intervals.

Figure 14:
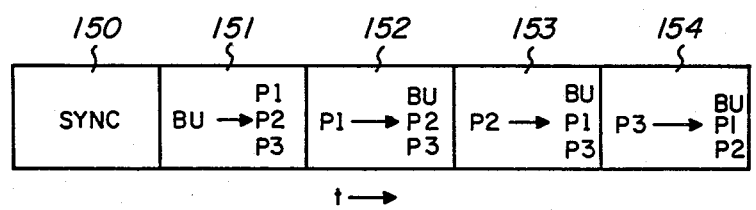
FIG. 14 is a timing diagram of predetermined sets of time intervals defining a transmit sequence for the system of FIG. 13.

One combination of these predetermined sets of time intervals is illustrated in FIG. 14. The particular combination illustrated consists of five sets of non-overlapping interleaved time intervals 150-154. During time interval 150, base unit 140 transmits synchronization signals that are received in parallel by each of the portable units 141. These synchronization signals are utilized within portable units 141 to synchronize the generation of their clocking signals p(t)/c(t) with each other. Such synchronization may be achieved by conventional phase locked loop circuits in combination with selective pulse generating circuitry such as the ring counter and associated control logic previously described in conjunction with FIG. 2.

During time interval 151, base unit 140 transmits information signals to all of the portable units. Subsequently, during time interval 152, portable unit P1 transmits information signals to base unit 140 and to portable units P2 and P3. Similarly, during time interval 153, portable unit P2 transmits to the base unit and to portable units P1 and P3; and during time interval 154, portable unit P3 transmits to the base unit and to portable units P1 and P2. This sequence then repeats over and over again. Electronic means for receiving the transmitted signals is also included within base unit 140 and portable units 141 for conversion of the transmitted signal for use by their respective output transducers.

Figure 15:
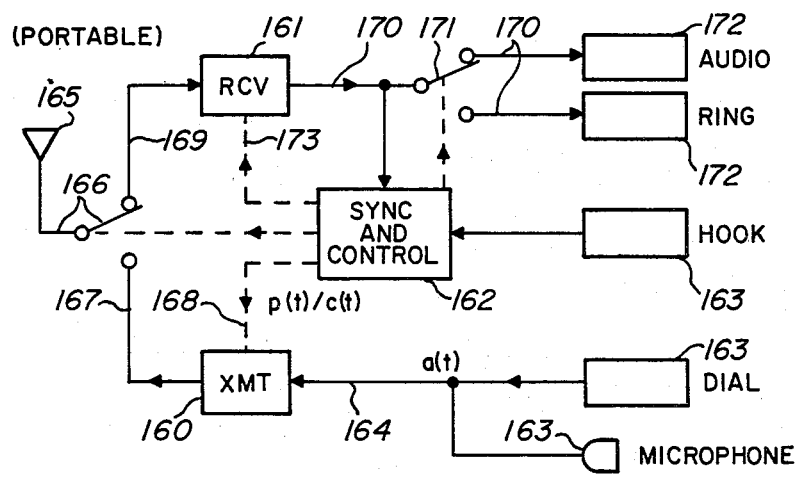
FIG. 15 is a block diagram of a portable unit suitable for implementing the time division transmit sequence of FIG. 14.

FIG. 15 is a block diagram of portable unit 141 suitable for implementing the time division transmit sequence of FIG. 14. Basically, this portable unit is comprised of a time division transmitter 160, a time division receiver 161, and a sychronization-control unit 162. Also included are input transducers 163 which include a microphone, a dial, and an "on-hook" detector. Transducers 163 have outputs coupled via leads 164 to the input of time division transmitter 160; and time division transmitter 160 has an output selectively coupled to an antenna 165 via a switch 166 and leads 167. Control unit 162 has an output coupled via leads 168 to transmitter 160 for generating thereon impulse signals p(t) to activate transmitter 160 in accordance with the time division transmit sequence of FIG. 14.

Transmitter 160 within the portable unit of FIG. 15, may be constructed according to the first embodiment of FIG. 1; or alternatively, it may be constructed according to the second embodiment of FIG. 12. If the first embodiment is used, then leads 164, 167, and 168 of FIG. 15 correspond to leads 20, 19, and 15, respectively, of FIG. 1. On the other hand, if the second embodiment is used, then leads 164, 167 and 168 of FIG. 15 correspond to leads 131, 136, and 132, respectively, of FIG. 12.

Radiated signals are received by the portable unit of FIG. 15 by antenna 165 and are selectively coupled via leads 169 and switch 166 to an input on receiver 161. An output of receiver 161 couples via leads 170 and a switch 171 to output transducers 172 which include a speaker and a "ring indicator". Control unit 162 has an output which couples to receiver 161 via leads 173 for generating thereon control signals which selectively activate receiver 161 in accordance with the time division transmit sequence of FIG. 14.

Figure 16:
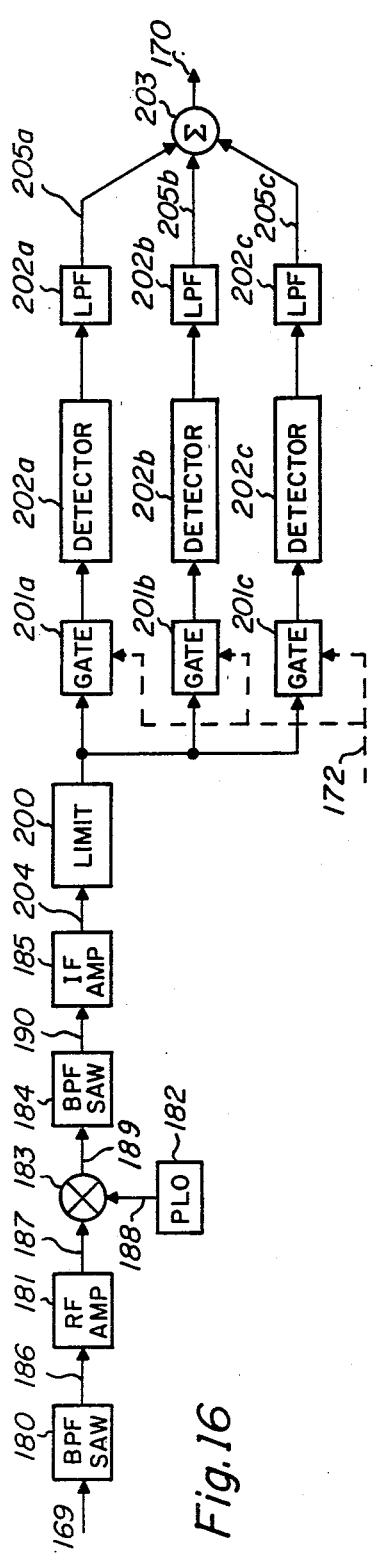
FIG. 16 is a block diagram of a receiver incorporated within the portable unit of FIG. 15.

Details of receiver 161 are illustrated in FIG. 16. Receiver 161 includes an acoustic surface wave device band pass filter 180, an RF amplifier 181, a local oscillator 182, a mixer 183, a second acoustic surface wave device band pass filter 184, and an IF amplifier 185. Band pass filter 180 has an input coupled to lead 169 and operates to reject image frequencies from the signals received thereon. Filter 180 has an output coupled via lead 186 to an input of RF amplifier 181. Amplifier 181 has a gain that is chosen to reduce the noise figure in receiver 161 to a predetermined level. A lead 187 couples the output of RF amplifier 181 to one input of mixer 183; while a lead 188 couples an output of local oscillator 182 to a second input of mixer 183. The frequency of oscillator 182 is chosen to place the product signals generated by mixer 183 at a predetermined IF frequency. Filter 184 couples via lead 189 to an output of mixer 183 and operates to pass only signals at the predetermined IF frequency. That is, filter 184 operates to pass one of the frequency spectrums I(f) which are spaced about the discrete frequencies 70 as was described in conjunction with FIG. 5. An output of filter 184 couples to amplifier 185 via a lead 190. Amplifier 185 provides a means for adding gain to the filtered IF signals.

The remaining portion of receiver 161 of FIG. 16 will vary in structure depending upon the type of modulation produced by transmitter 160. FIG. 16 illustrates a suitable structure for demodulating frequency modulated signals as an example. This frequency demodulator includes a limitor 200, logical control gates 201a–201c, detector and low pass filter means 202a–202c, and a summer 203. Limitor 200 couples to an output of IF amplifier 185 via a lead 204, and operates to make the signals generated thereon have a uniform maximum amplitude.

An output of limitor 200 couples in parallel to the input of control gates 201a–201c. Control gates 200a–201c operate to selectively pass their input signals in response to control signals on leads 172. Thus for example, in accordance with the time division transmit scheme of FIG. 14, portable unit P1 enables gate 201a during time intervals 151, enables gate 201b during time intervals 153, and enables gate 201c during time intervals 154.

Gates 201a–201c have outputs which couple respectively to inputs on detectors 202a–202c. Detectors 202a–202c operate to demodulate the samples of signals applied to their inputs. That is, detectors 202a–202c convert the samples of signals applied to their inputs to continuous signals having frequency components in the audio frequency range with magnitudes proportional to the corresponding signals a(t) which were transmitted. These demodulated signals are generated on output leads 205a–205c. Leads 205a–205c are coupled to summer 203 which operates to generate a continuous waveform on lead 170 proportional to the summation of its input signals.

Figure 17:
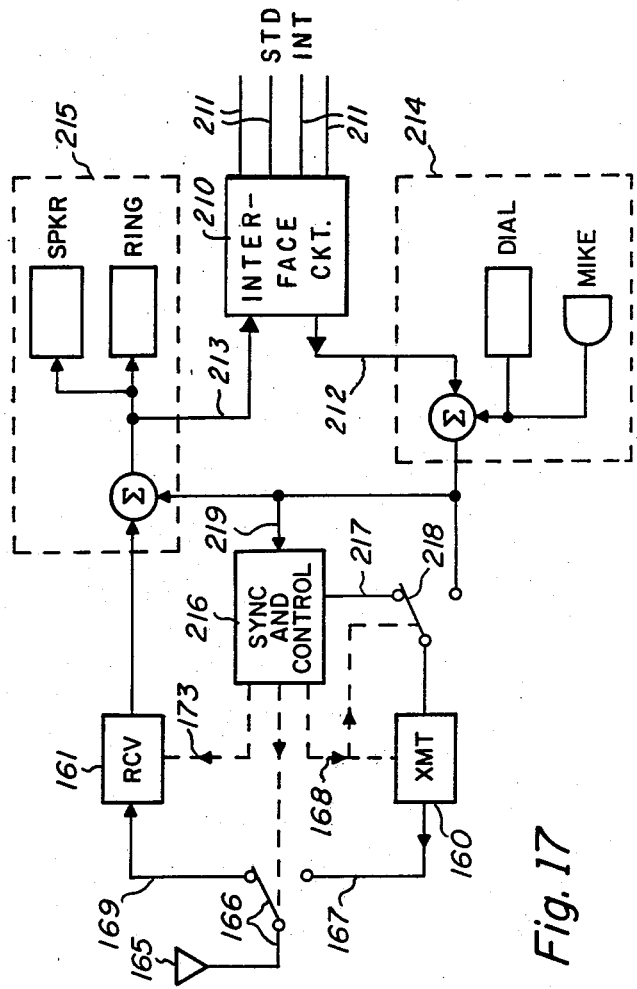
FIG. 17 is a block diagram of a base unit for use within the communication system of FIG. 13.

A block diagram of a base unit suitable for operation within the cordless telephone system of FIG. 13 is illustrated in FIG. 17. Basically, the base unit of FIG. 17 is similar in construction to the portable unit of FIG. 15. Similar portions of the two units are indicated by like reference numerals. One difference between the units is that the base unit includes interface circuitry 210 for transmitting and receiving signals to/from a standardized telephone interface 211. Circuitry 210 has an output lead 212 and signals received from standard interface 211 are generated thereon at voltage levels compatible with transmitter 160. Similarly, circuitry 210 has an input lead 213 which is coupled to receive signals from receiver 161; and signals on lead 213 are generated on interface 211 at voltage levels compatible with the standard telephone interface.

Input transducers 214 and output transducers 215 may optionally be included within the base unit. Transducers 214 and 215 are similar in structure and function to the previously described transducers of the portable unit of FIG. 15. Synchronization and control circuitry 216 is also included in the base unit. Control circuitry 216 is similar in function to the previously described control circuitry 162 in that it generates impulse signals on leads 168 to selectively activate transmitter 160; and it generates selective gating signals on leads 173 to selectively activate the various detectors 202a–202c within receiver 161.

In addition, however, control circuitry 216 further includes an output lead 217 that is selectively coupled to the input of transmitter 160 via a logically controlled switch 218.

Synchronization signals are generated on lead 217 during time intervals 150 as was previously described in conjunction with FIG. 14. Control circuitry 216 also has an input 219 for receiving control signals, such as "ring" or "selective call signals" from standard telephone interface 211.

Figure 18:
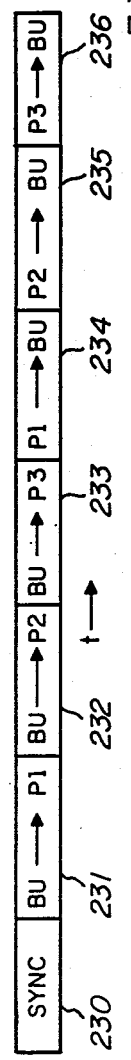
FIG. 18 is a timing diagram of predetermined sets of time intervals defining a second transmit sequence for the system of FIG. 13.

Referring now to FIG. 18, there is illustrated a timing diagram of second predetermined sets of time intervals suitable for defining the time multiplexing within the cordless telephone system of FIG. 13. These sets include seven distinct time intervals 230–236 that are repeated over and over. This sequence enables one of the portable units P1-P3 to selectively transmit and receive to telephone interface 211 through the base unit, and simultaneously enables the other two portable units to transmit and receive between each other.

During time interval 230, synchronization signals are transmitted by the base unit to each of the portable units P1-P3. Subsequently during time intervals 231, 232, 233, the base unit transmits signals which are selectively received by portable units P1, P2, and P3 respectively. Similarly, during time intervals 234, 235, and 236, portable units P1, P2 and P3 respectively transmit signals to the base unit. Subsequently, the base unit selectively retransmits these signals to the portable units during the next time intervals 231-233.

Portable units in a cordless telephone system operating with the timing sequence of FIG. 18 are similar in construction to those described in conjunction with FIGS. 15 and 16. One difference is that time division receiver 161 within the portable unit includes only one control gate 201, one detector and low pass filter 202, and no summing circuit 203. Gating signals are applied to leads 172 to selectively enable gating circuit 201a and detector 202a in accordance with the timing diagram of FIG. 18. For example, portable unit P1 enables its detector during time interval 231; while portable units P2 and P3 enable their detectors during time intervals 232 and 233, respectively.

FIG. 19 is a block diagram of a base unit suitable for operation with the timing sequence indicated in FIG. 18. This base unit is similar to the base unit previously described in conjunction with FIG. 17; and again corresponding portions have like reference numerals. The time division receiver 161 within the base unit has the same structure as that previously described in conjunction with FIG. 16, with the exception that it does not include summer 203. Instead, leads 205a–205c are coupled to logically controllable switching circuits 240 and 241. Circuit 240 has an output lead 242 that couples to the input of interface circuit 210. Similarly switching circuit 241 has an output lead 243 that couples to the input of transmitter 160.

The base unit of FIG. 19 also includes a synchronization and control circuit 244 which has outputs coupled via leads 245 and 246 to control inputs on switching circuits 241 and 240, respectively. Control signals on leads 245 and 246 select various ones of the signals as leads 205a–205c to the switching circuit output. Thus for example, if portable unit P1 is to transmit to standard interface 211, control circuit 244 selectively couples lead 205a to lead 242 by means of switching circuit 240. Similarly, if portable unit P2 is to transmit signals to portable units P3 and visa versa, control circuit 244 selectively couples leads 205b and 205c to lead 243 during time intervals 232 and 233, respectively.

FIG. 20 is a timing diagram of third sets of predetermined time intervals by which the cordless telephone system of FIG. 13 may be operated. Specifically included are 13 sets of time intervals 250–262. This sequence enables one portable unit to selectively transmit and receive from the standard interface 211 through the base unit, and simultaneously enables the other portable units to transmit and receive to each other. This capability is the same as that which is achieved by the second timing sequence of FIG. 18; however, by utilizing the firing sequence of FIG. 20, the capability is achieved with less hardware. In particular, by utilizing the FIG. 20 timing sequence, the receivers 161 in each portable unit and in the base unit are similar to those of FIG. 16, with the exception that they include only one gate control circuit 201a, only one detector-low pass filter 202a, and no summing circuit 203. Also, the portable unit includes no switching circuit 240 or 241; and thus it is constructed according to the structure of FIG. 17.

In operation, the time intervals 250–262 are allocated to enable transmission by any one particular unit directly to any other particular unit. For example, time interval 259 is reserved for transmissions from portable unit P2 to portable unit P3. Thus during time interval 259, the transmitter 160 in the portable unit P2 is activated by an impulse received from its control circuitry; and during the same time interval the receiver 161 in portable unit P3 is activated by a selective gating signal on lead 173. Conversely, during time interval 261, the transmitter 160 in portable unit P3 is activated and the receiver 161 in the portable unit P2 is activated. Accordingly, direct transmissions take place between portable units P2 and P3 during time intervals 259 and 261. Interleased between the P2-P3 transmissions are transmissions between portable unit P1 and the base unit. These take place during time intervals 251 and 254.

The particular combination of transmissions just described is exemplary only. The time division transmission sequence of FIG. 20 enables any one portable unit to transmit and receive from any other portable unit, while at the same time, the third portable unit may transmit and receive signals from standard telephone interface 211.

Various embodiments of the invention have now been described in detail. However, in addition to these described details, many changes and modifications can be made without departing from the nature and spirit of the invention. For example, the time division multiplexing sequences described in conjunction with FIGS. 14, 18, and 20, may be expanded to include a larger number of portable units. In addition, the base unit described in conjunction with FIG. 19 may be expanded to include input transducers 214 and output transducers 215 as was described in conjunction with the base unit of FIG. 17.

Further, additional types of input transducers or output transducers may be included in the system. For example, a portable unit may include an input transducer which senses smoke or temperature. The control means 162 could then generate a predetermined message to be transmitted via transmitter 160 in response to the detection of a predetermined level of smoke or temperature. As another example, a portable unit may include an output transducer which receives digitally encoded signals from receiver 161, and in response thereto takes some predetermined action such as turning on/off various lights within a building. Therefore, since many changes and modifications can be made to the above details without departing from the nature and spirit of the invention, it is understood that the invention is not to be limited to said details except as set forth in the appended claims.

What is claimed is:

1. A time division sample modulating device for sample modulating electronic information signals comprising:

pulse position modulator means having a first input for receiving input signals a(t) in the audio range and a second input for receiving input impulse signals p(t) as uniformly spaced sampling signals simultaneously with the receipt of the input signals a(t) by said first input and generating in response to each sampling signal an output impulse signal p(t-$\beta$ a(t)) having a position in time indicating the amplitude of input signals a(t) simultaneously received; and acoustic surface wave device means having a tailored impulse response h(t) of a predetermined shape and a finite length for receiving the output impulse signals generated by said pulse position modulator means and generating shaped electrical output signals proportional to the convolution of the output impulse signals generated by said pulse position modulator means and the tailored impulse response h(t) of said acoustic surface wave device means.

2. A device as set forth in claim 1, further including switching means connected to the first input of said pulse position modulator means for time multiplexing a plurality of said input signals a(t) to said first input.

3. A cordless communication system comprising:

a base unit;

at least one portable unit; and each of said base unit and said portable unit having time division transmitter means for transmitting to each other via electromagnetic radiation in one finite frequency band during different time intervals samples of information signals;

said time division transmitter means of each of said base unit and said portable unit including pulse position modulator means having a first input for receiving input signals a(t) in the audio range and a second input for receiving input impulse signals p(t) as uniformly spaced sampling signals simultaneously with the receipt of the input signals a(t) by said first input and generating in response to each sampling signal an output impulse signal p(t-$\beta$ a(t)) having a position in time indicating the amplitude of input signals a(t) simultaneously received, and acoustic surface wave device means having a tailored impulse response h(t) of a predetermined shape and a finite length for receiving the output impulse signals generated by said pulse position modulator means and generating shaped electrical output signals proportional to the convolution of the output impulse signals generated by said pulse position modulator means and the tailored impulse response h(t) of said acoustic surface wave device means.

4. A cordless communication system as set forth in claim 3, wherein said base unit further includes telephone interface means having an input coupled to said first input of said pulse position modulator means.

5. A cordless communication system as set forth in claim 4, wherein a plurality of N portable units are provided with said base unit, and said acoustic surface wave device means within said time division transmitter means of said base unit and each portable unit being clocked in synchronization to enable said transmitter means of each of said base unit and said N portable units to generate said output signals during predetermined sets of non-overlapping interleaved time intervals.

6. A cordless communication system as set forth in claim 5, wherein said base unit transmits during one set of said predetermined time intervals to all of said portable units, and each of said portable units transmits during only one respective set out of N sets of said predetermined time intervals to said base unit.

7. A cordless communication system as set forth in claim 5, wherein said base unit further includes means for receiving said output signals transmitted by said portable units, and also includes switching means for coupling selected ones of said output signals received from said portable units to said telephone interface means.

8. A cordless communication system as set forth in claim 5, wherein said base unit selectively transmits during N sets of said predetermined time intervals to said N portable units each of which selectively receives during only one of said N sets of time intervals, and wherein each of said portable units transmits during only one respective set out of N other sets of said predetermined time intervals to said base unit.

9. A cordless communication system as set forth in claim 8, wherein said base unit further includes means for receiving said output signals transmitted by said portable units, and also includes switching means having multiple inputs coupled to receive said output signals from said portable units and from said telephone interface means and having an output coupled to said first input of said pulse position modulator means for selectively time multiplexing signals from said multiple inputs to said pulse position modulator means during said N sets of time intervals.

10. A cordless communication system as set forth in claim 8, wherein said base unit further includes switching means for coupling selected ones of said output signals received from said portable units to said telephone interface means.

11. A cordless communication system as set forth in claim 5, wherein said base unit selectively transmits during N sets of said predetermined time intervals to said N portable units each of which selectively receives during only one of said N sets, and wherein each of said portable units selectively transmits during respective N sets of said predetermined time intervals to the other portable units and to said base unit which selectively receive during only one of the sets within each of the respective N sets.

* * * * *